(12) United States Patent
Stutz

(10) Patent No.: US 9,108,688 B2
(45) Date of Patent: Aug. 18, 2015

(54) TRUCK TRACTOR

(71) Applicant: Marco Stutz, Kreuzlingen (CH)

(72) Inventor: Marco Stutz, Kreuzlingen (CH)

( * ) Notice: Subject to any disclaimer, the term of this patent is extended or adjusted under 35 U.S.C. 154(b) by 0 days.

(21) Appl. No.: 14/338,732

(22) Filed: Jul. 23, 2014

(65) Prior Publication Data

US 2015/0028628 A1   Jan. 29, 2015

Related U.S. Application Data

(60) Provisional application No. 61/872,128, filed on Aug. 30, 2013.

(30) Foreign Application Priority Data

Jul. 23, 2013 (CH) ........................................ 1302/13

(51) Int. Cl.
| | | |
|---|---|---|
| *B60J 7/00* | (2006.01) | |
| *B62D 33/06* | (2006.01) | |
| *B60P 3/32* | (2006.01) | |

(52) U.S. Cl.
CPC ............... *B62D 33/0612* (2013.01); *B60P 3/32* (2013.01)

(58) Field of Classification Search
CPC .. B62D 35/001; B62D 33/0612; B62D 53/12; B62D 53/0885; B60G 2300/04; B60G 2800/912; B08B 3/024; B60D 1/62; B60D 1/363; B60P 3/40
USPC .......... 296/190.02, 190.01; 180/89.12, 89.13, 180/89.16
See application file for complete search history.

(56) References Cited

U.S. PATENT DOCUMENTS

| | | | | |
|---|---|---|---|---|
| 3,567,272 | A * | 3/1971 | Low ............................... | 296/156 |
| 3,588,168 | A * | 6/1971 | Froitzheim et al. ...... | 296/190.02 |
| 4,201,415 | A * | 5/1980 | Suchanek ................ | 296/190.02 |
| 5,201,379 | A * | 4/1993 | Penzotti et al. ............ | 180/89.18 |
| 5,984,404 | A * | 11/1999 | Novoa et al. ............. | 296/190.02 |
| 6,578,905 | B1 * | 6/2003 | Buchanan et al. ....... | 296/190.02 |
| 6,644,724 | B1 * | 11/2003 | Penaloza et al. ......... | 296/190.02 |
| 6,692,051 | B1 * | 2/2004 | Cook et al. ................. | 296/24.39 |
| 6,718,574 | B1 * | 4/2004 | Bradley et al. .................... | 5/118 |
| 7,178,180 | B2 * | 2/2007 | Gardner ........................... | 5/10.1 |
| 7,210,724 | B2 * | 5/2007 | Bernstein .................... | 296/37.14 |
| 7,303,226 | B2 * | 12/2007 | Bernstein et al. ........ | 296/190.01 |
| 7,325,860 | B2 * | 2/2008 | Day .............................. | 296/156 |
| 7,464,962 | B2 * | 12/2008 | Hakansson et al. ........... | 280/749 |
| 7,600,808 | B2 * | 10/2009 | Hinze et al. .............. | 296/190.08 |
| 7,862,106 | B2 * | 1/2011 | Hinze et al. ............. | 296/190.05 |
| 8,986,056 | B2 * | 3/2015 | Neprud ...................... | 440/12.54 |
| 2006/0242762 | A1* | 11/2006 | Drummond et al. .............. | 5/118 |
| 2007/0200392 | A1 * | 8/2007 | Eiswirth ................... | 296/190.02 |
| 2008/0164724 | A1* | 7/2008 | Burnett et al. ........... | 296/190.02 |
| 2008/0191515 | A1* | 8/2008 | Hollenbeck .............. | 296/190.02 |
| 2009/0256392 | A1* | 10/2009 | Buda et al. ............... | 296/190.02 |
| 2011/0309656 | A1* | 12/2011 | Buda et al. ............... | 296/190.02 |
| 2012/0220176 | A1* | 8/2012 | Neprud ...................... | 440/12.52 |
| 2014/0004761 | A1* | 1/2014 | Neprud ...................... | 440/12.52 |

* cited by examiner

*Primary Examiner* — Kiran B Patel
(74) *Attorney, Agent, or Firm* — Volpe and Koenig, P.C.

(57) ABSTRACT

A truck tractor (1) having, in addition to the driver and passenger seats (27, 29) in the driver cabin, a kitchenette (39) with a sink (43) and a stove (41) as well as a refrigerator (45) in an upper level. A bench (23) serves for dining, which is arranged behind a table (38). The living area is accessed via stairs (26) from a lower level, in which a half bath and a shower stall as well as a sleeping area with a bed and the appropriate infrastructure are located for the living area and the engine (1).

12 Claims, 6 Drawing Sheets

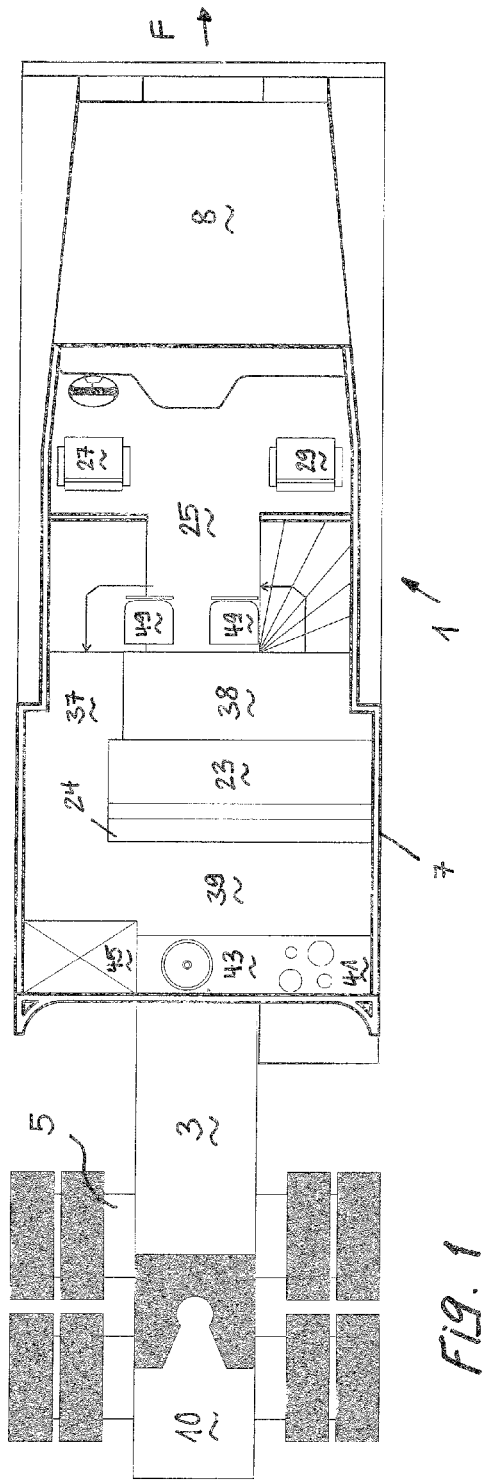
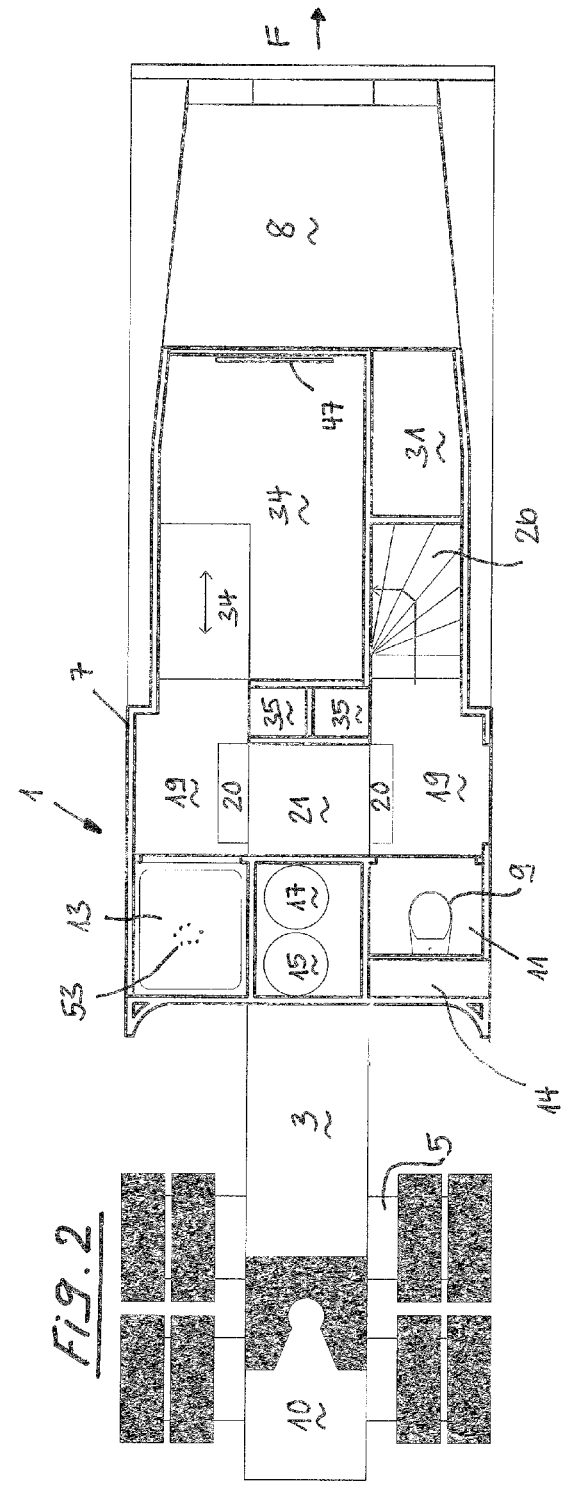

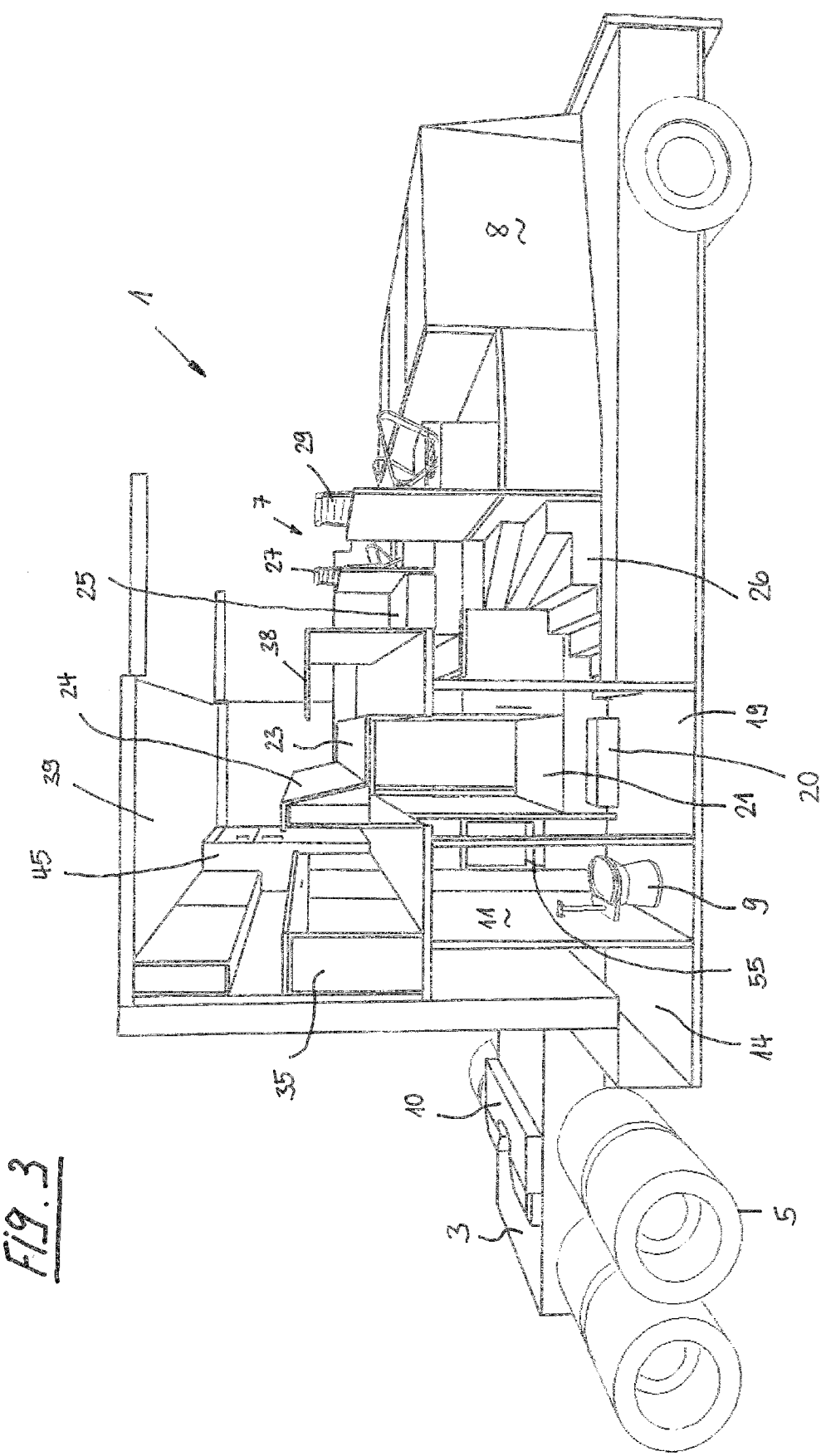

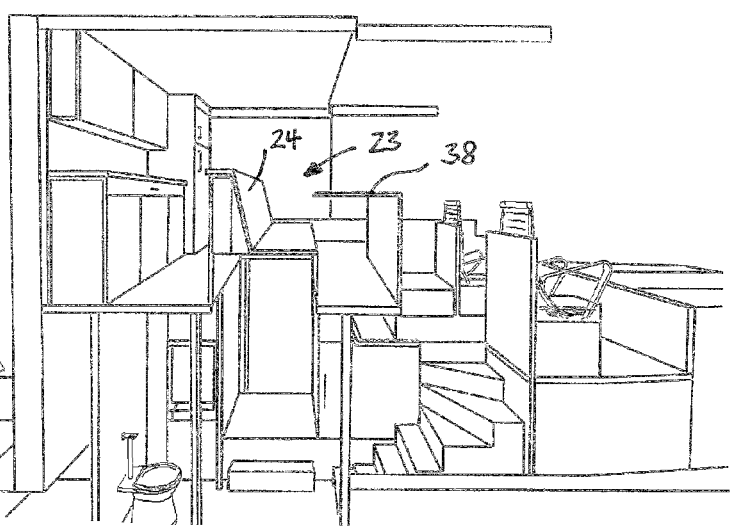
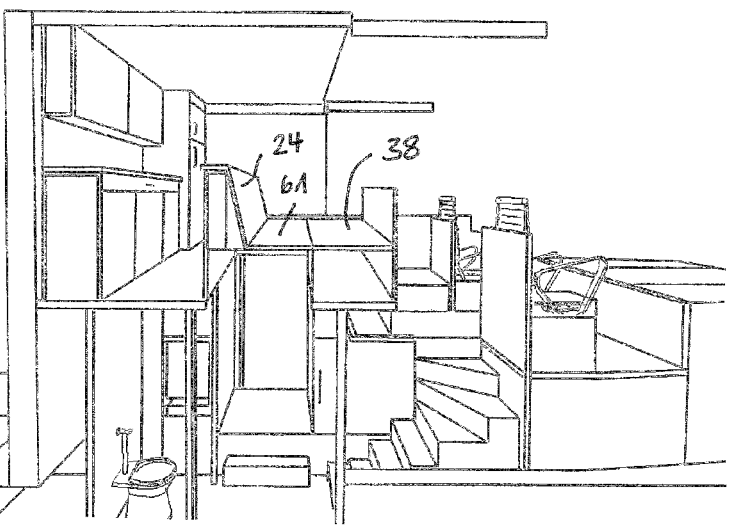
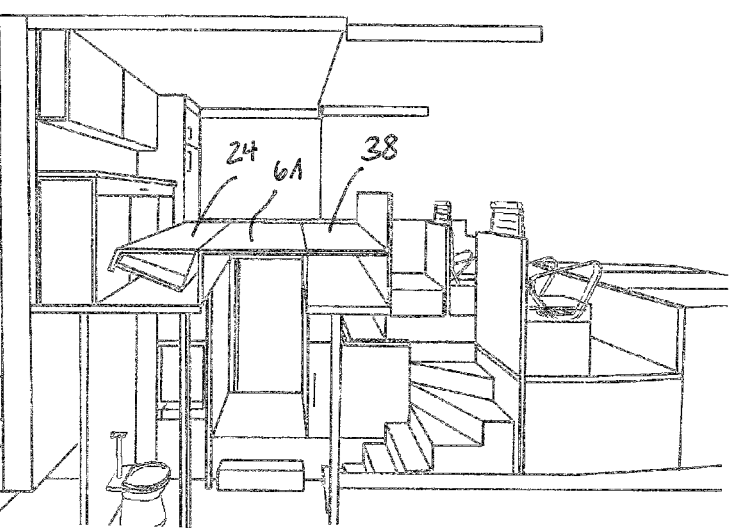

TRUCK TRACTOR

INCORPORATION BY REFERENCE

The following documents are incorporated herein by reference as if fully set forth: U.S. Provisional Application No. 61/872,128, filed Aug. 30, 2013; and Swiss Patent Application No. 01302, filed Jul. 23, 2013.

BACKGROUND

The invention is directed to a truck tractor arrangement.

Truck tractors with a driver cabin and living quarters arranged behind said driver cabin are known and are very frequently used primarily in the United States of America, so that the driver can live comfortably during drives frequently lasting several weeks. Such vehicles are the pride of the drivers and owners of the tractor trailer-rigs.

In the truck tractors with living quarters of prior art the space available between the axles of the truck tractor is usually used very poorly because the living quarters fail to form a real unit with the driver cabin. Accordingly the driver is only provided with very restricted conditions in the living and sleeping areas. Additionally, any storage space improving comfort is not provided and/or is not used for this purpose.

SUMMARY

The objective of the present invention is to provide a truck tractor with generous living and sleeping areas, in which the driver and at least one passenger can eat and rest over night after hours of driving.

This objective is attained in a truck tractor having one or more features of the invention.

Advantageous embodiments of the truck tractor are described below and in the claims.

Here, the utilization of the complete volume encased in a truck tractor is achieved, particularly also the areas next and above the chassis, which connects the front and the rear axles of the tractor with each other, to generously design both the living and eating area but also the important sleeping area. The arrangement of the toilet and shower area at the side of the chassis and the waste water and freshwater tanks therebetween above the chassis allows achieving free standing height in these rooms as well as the sleeping area arranged approximately at the same level further up front. The area in the level thereabove can be reached via generous stairs and under the stairs additionally the fuel tanks and/or batteries can be stored. A kitchen is located in the upper store as well as an eating area, again showing free standing height, forming a generous space, because both areas extend over the entire width of the vehicle. The connection to the driver area and the passenger area in the driver cabin occurs via short stairs from the eating area. The greater height of the driver cabin and the living quarters located therebehind allow an optimal aerodynamic design of the transition from the tractor to the trailer. Additionally, the air space above the roof of the driver cabin, which is lower than the roof of the trailer and frequently unused in prior art, is added to the living quarters in its entirety, here.

BRIEF DESCRIPTION OF THE DRAWINGS

Based on an illustrated exemplary embodiment the invention is explained in greater detail. It shows:

FIG. 1 a plan of the upper level of a schematically shown truck tractor with a driver cabin and living and sleeping areas, FIG. 2 a plan of the lower level of the truck tractor according to

FIG. 1,

FIG. 3 a perspective view of the right side of the truck tractor with removed exterior walls and a removed roof, FIG. 4 a perspective view of the left side of the truck tractor with removed lateral walls and a removed roof, FIG. 5 a perspective view of the upper level of the truck tractor, seen from the rear, FIG. 6 a perspective view of the left side of the truck tractor with a pulled-out partial section of the bed in the sleep position, FIG. 7 a perspective detail of the left side of the truck tractor with cut-off side areas without chairs at the table, FIG. 8 a perspective view of the right side of the truck tractor with cut-off side areas of the living quarters, FIG. 9 a perspective view of the right side of the truck tractor with the top of the table being lowered, and FIG. 10 a perspective view of the right side of the truck tractor with cut-off side areas showing the back of the bench seat in the folded state.

DETAILED DESCRIPTION OF THE PREFERRED EMBODIMENTS

Figure 4:
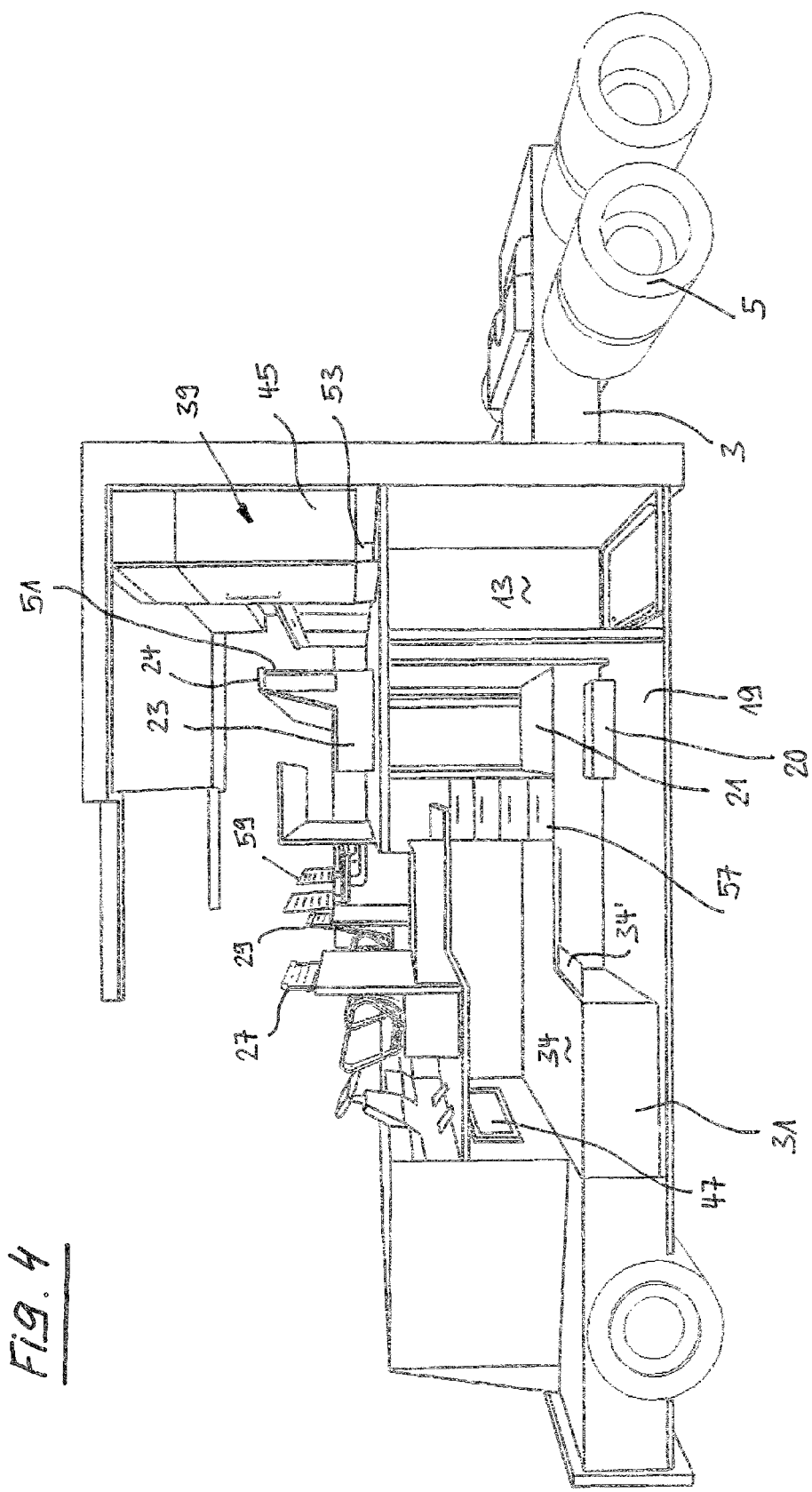

A truck tractor, called engine 1 for short, is marked with the reference character 1. A driver cabin with living and sleeping quarters 7 is placed onto the chassis 3, which is discernible only in the area of the two rear axes 5. The reference character 8 marks the engine compartment and the reference character 10 the semi-trailer coupling. In the lower level according to FIG. 2, next to the chassis 3 in the rear section a toilet 9 is arranged in a half bathroom 11 and a shower stall 13 on the other side of the chassis. The floors of the half bathroom 11 and the shower stall 13 are at the level of the undercarriage of the engine 1, just as the floors of the hallways 19. The freshwater tank 15 and the wastewater tank 17 are arranged between the shower stall 13 and the half bathroom 11, above the chassis 3. A bicycle, a Segway, or the like may be stored behind the half bath 11, in the storage space 14 provided here.

In the travel direction in front of the half bath 11 and the shower stall 13, both of which can be closed by doors towards the corridor 19, the hallway 19 is embodied in free standing height at both sides of the chassis 3. The floor area 21 above the chassis 3, which serves as a passage from the right to the left driver cabin side and/or connects the hallways 19, also shows free standing height, because a bench 23 is arranged in the upper level above the ceiling of the hallways 19. Due to the fact that the sitting area of the bench 23, showing the back rest 24, is cut-out at the bottom the free standing height (head room) in the lower level can be obtained above the chassis 3. Below the lateral sections of the bench 23 and the back rest 24, which are located above the hallways 19, storage space 35 is integrated.

The hallway 19 at the right side, seen in the travel direction, abuts the stairs 26, which lead to the upper level and end in a stoop 25 with free standing height. The stoop 25 extends, seen in the travel direction, up to the driver seat 27 and the passenger seat 29.

In the travel direction in front of the stairs 26, in a chamber 31, fuel tanks or batteries are stored. Another chamber 31 is located mirror-reflected on the left side of the engine 1 and may be used for the same purpose or another one.

In the lower level, accessible from the left hallway 19, additionally the sleeping area is formed with a generously sized bed 34 on the one side above the chassis 3 and on the other side at the left side outside thereof. A part 34' of the bed 34 may be pushed aside, e.g., during the daytime, in order to facilitate the access to the bed 34. In the travel direction F of the engine 1 a television set 47 may be arranged or inserted above the bed 34. At the head of the bed 34 one or more boxes 35 may be arranged, accessible from the hallway 19.

According to FIG. 1, in the upper level, which is accessed via the stairs 26, a large dining table 38 is arranged in front of the bench 23, which is accessible from the rear via the upper hallway 37. Behind the back rest 24 of the bench 23 towards the table 38 a kitchenette 39 is arranged with a stove 41 and a sink 43, which are arranged perpendicular in reference to the travel direction F, as well as a generously sized refrigerator 45 directly above the shower stall 13. All areas of the upper level show free standing height. Ay the side of the table 38 opposite the bench 23 chairs or stools 49 may be arranged, which can be stowed under the table 38 when not in use. Additionally the table 38 can be lowered in another embodiment, allowing on its surface and the seat of the bench 23 to create one or two additional sleeping areas. In the back rest 24 of the bench 23, facing the kitchenette, drawers or shelves 51 may be integrated.

A shower head 53 in the shower stall 13 is installed in a box, which penetrates the floor of the upper level underneath the refrigerator, ensuring full standing height in the shower stall 13 even under the shower head.

In the two FIGS. 3 and 4, which show perspective illustrations of the structure and the interior installations of the truck tractor 1, advantageous details are displayed, which are not discernible in the two plans according to FIGS. 1 and 2 or only part are seen, here. In both figures the side walls of the driver cabin and the living quarters 7 of the truck tractor 1 are omitted in order to show clearly all objects of the interior design.

The driver and the passenger reach their seats 27, 29 via the hallway 19 at the right side of the engine 1. From here, they reach via the stairs 26, which is located directly in front of the hallway 19, upstairs to the stoop 25, from which they can pass forwards between the two seats 27, 29 to reach their places. Via the same path the kitchen 39 is approached. Here, the passage occurs from the stoop 25 at the left driver side towards the rear laterally past the bench 23. From the same place the seat 23 can be reached and the chairs 49, if they are pulled out from their stowed position underneath the table 38 and placed on the floor. In the kitchenette 39, which comprises all equipment used in a residential setting, the food can be placed directly above the back rest 24 of the bench 23 onto the table 38. The second level therefore represents the living, cooking, and eating area for the driver and the passenger and perhaps additional persons. Slightly offset downwards the driver cabin is located with the two seats 27, 29. The driver cabin slightly offset downwards allows from the bench 23 to look freely towards the front (in the travel direction F) and outside. Of course, windows may also be embodied laterally at the engine 1.

In the entry area, via the hallway 19 arranged at the right side, the toilet 9 in a separate half bath 11 is accessible in the rear in the travel direction. In the half bath 11 additionally a small sink 55 with a mirror is arranged. The half bath 11 is separated by a door (not shown) from the hallway 19. From the entry side of the hallway 19 via a step 20 on the floor 21 above the chassis 3 a left-side hallway 19 is accessible. In order to also provide free standing height above the floor 21 the bench 23 is open towards the bottom. At the left driver side once more a step 20 is provided in order to compensate the height difference between the floor 21 above the chassis 3. In the left hallway 19, at the left side, i.e. the shower stall 13 is located (FIG. 4), which is accessible via a door. In order to design the shower comfortable even for tall persons the shower head 53 is installed in a recessed fashion in the ceiling of the shower stall 13, namely in the base of the refrigerator 45 located overtop thereof.

Opposite the shower stall 13 the sleeping area is located with a large bed 34, under which once more for example a battery or fuel can be store, accessible from the outside of the engine 1. The bed 34 extends perpendicular in reference to the travel direction F above the chassis 3, so that a double bed develops. In order to optimize the sleeping area the portion of the hallway in the left section of the bed 34 is extendable like a drawer. From the bed 34 and/or when laying in the bed 34 a television set 47 can be installed at or in the front wall. Laterally of the floor 21 above the chassis 3 and accessible from the sleeping area, a set of drawers 57 can be provided.

Figure 5:
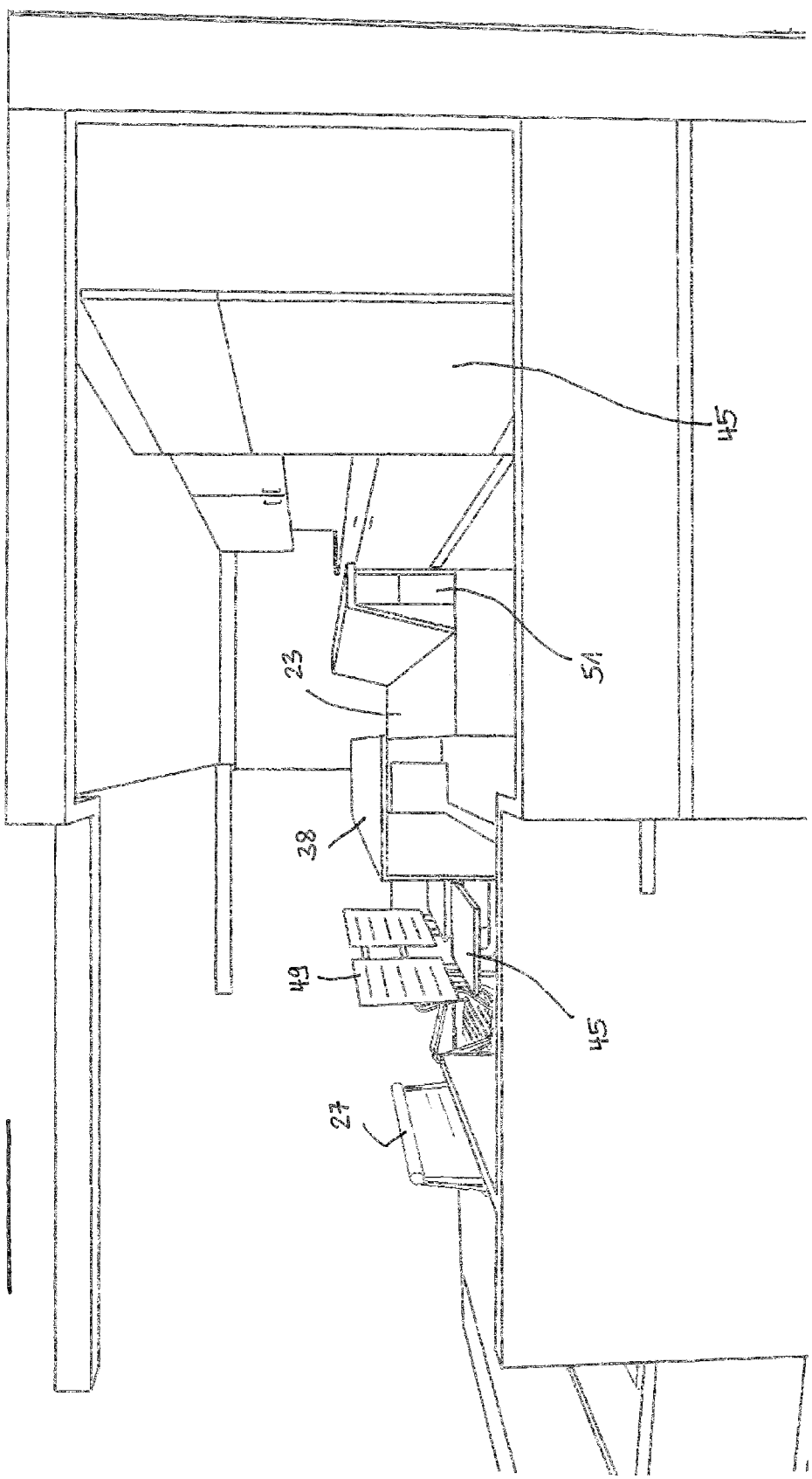

FIG. 5 additionally shows the chairs 49 in detail and their position is discernible in reference to the table 38.

Figure 6:
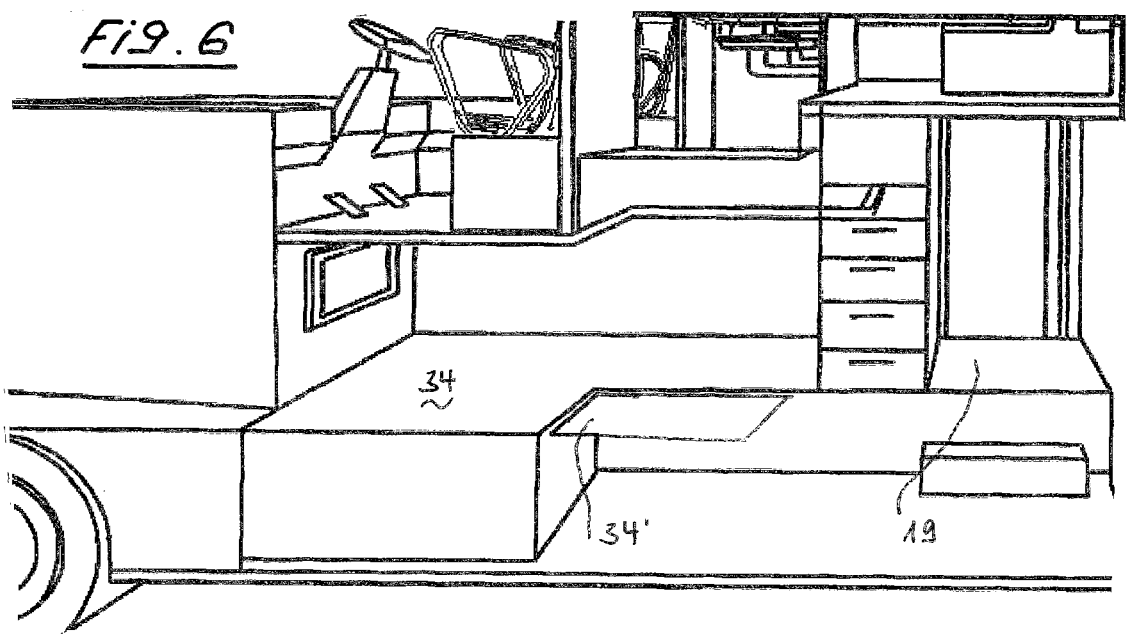

In FIG. 6, the illustrated detail of the cut-open left side of the truck tractor 1 shows the telescopic part 34' of the bed 34 in its completely extended position. In this position a king/queen size bed of common size develops for two persons.

Figure 7:
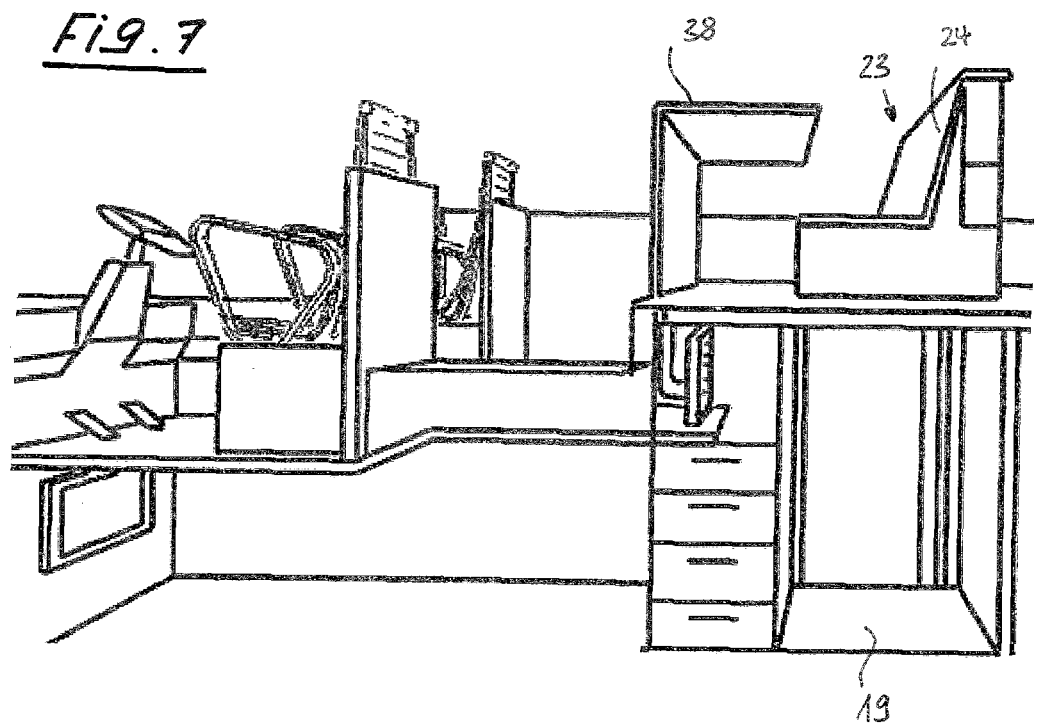

FIG. 7 shows once more a detail of the upper level, however without the seats 59 fastened at the table 38 at the left side of said table 38.

FIGS. 8 to 10 show the conversion of the table 38 and the bench 23 with its back rest 24 into an additional bed. After the top of the table 38 has been lowered to the plane of the seat area 61 of the bench 23 the back 24 is also pivoted towards the back until it forms a plane with the lowered top of the table (and) the seat area 61.

The overall height of the truck tractor 1 is preferably identical to the height of the trailer so that no aerodynamically disadvantageous steps develop between these two vehicle parts and consequently an aerodynamically optimal condition can be achieved.

LEGEND OF THE REFERENCE CHARACTERS

1 Truck tractor
3 Chassis
5 Rear axes
7 Driver cabin and living quarters
8 Engine compartment
9 Toilet
10 Semi-trailer coupling
11 Half bath
13 Shower stalls
14 Storage space
15 Freshwater tank
16 Undercarriage
17 Wastewater tank
19 Hallway
20 Step
21 Floor above chassis
23 Bench
24 Back rest
25 Stoop
26 Stairs
27 Driver seat
29 Passenger seat
31 Battery and fuel
34 Bed
34' Part of the bed
35 Boxes
37 Upper hallway
38 Table
39 Kitchenette 41 Stove
43 Sink
45 Refrigerator
47 Television set
49 Chair
51 Drawers
53 Shower head
55 Sink
57 Set of drawers
59 Seats
61 Seat area

The invention claimed is:

1. A truck tractor (1) comprising a driver and passenger cabin (7), an eating, living, and sleeping area connected to the driver and passenger cabin (7), including several separate rooms located on lower and upper levels arranged over top of each other, which are connected to each other via stairs (26), with the lower level comprising a half bath (11), a shower stall (13), and a sleeping area with a bed (34) and the upper level, connected via the stairs (26), comprising a kitchenette (39), a dining area with a table (38) and bench (23), and the driver and passenger cabin are arranged with the driver seat (27) and the passenger seat (29) in a front engine area.

2. A truck tractor according to claim 1, wherein the rooms in the upper level and in the lower level provide a free standing height.

3. A truck tractor according to claim 1, wherein in the lower level, above a chassis (3) with the drive shaft tunnel, the sleeping area with the bed (34) is arranged in the front section, and in the rear area, freshwater (15) and wastewater tanks (17) are arranged and therebetween a connecting floor (21) with the free standing height is located as a connection of two hallways (19), connected to each other, which are arranged lateral in reference to the chassis (3).

4. A truck tractor according to claim 1, wherein under a floor of the driver and passenger cabin, located lower in reference to an upper hallway (37) of the upper level, at least one chamber (31) is provided for fuel tanks or batteries.

5. A truck tractor according to claim 1, wherein the kitchenette includes a sink (43), a stove (41), and a refrigerator (45) arranged in the upper level, in a travel direction (F) behind the dining area and above the half bath (11) and the shower stall (13).

6. A truck tractor according to claim 3, wherein under the bench (23), a head room is formed for the connection of two hallways (19).

7. A truck tractor according to claim 3, wherein a part of the bed (34') located lateral in reference to the chassis (3) is detachable.

8. A truck tractor according to claim 3, wherein in the sleeping area means are arranged for fastening or inserting a television set (47).

9. A truck tractor according to claim 3, wherein the floors of the half bath (11) and the shower stall (13) as well as the hallways (19) located in a travel direction (F) in front thereof are arranged on an entry level and arranged next to the chassis.

10. A truck tractor according to claim 1, wherein a shower head (53) in the shower stall (13) is installed in a box open downwardly located underneath a refrigerator (45).

11. A truck tractor according to claim 1, wherein a back rest (24) of the bench (23) is pivotable into a plane of a seat area (61) of the bench (23) and a top of the table (38) is embodied such that to be lowerable to a plane of seats (59) of the bench (23).

12. A truck tractor according to claim 1, wherein a storage space is located in a back rest (24) of the bench (23).

* * * * *